US012715606B2

(12) United States Patent
Zulch, III et al.

(10) Patent No.: US 12,715,606 B2
(45) Date of Patent: Aug. 25, 2026

(54) INTEGRATED DEVICE FOR USE IN A VEHICLE

(71) Applicant: HONEYWELL INTERNATIONAL INC., Charlotte, NC (US)

(72) Inventors: Harold A. Zulch, III, Phoenix, AZ (US); Robert S. Doyle, Phoenix, AZ (US); Jason Bialek, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 102 days.

(21) Appl. No.: 18/783,763

(22) Filed: Jul. 25, 2024

(65) Prior Publication Data

US 2026/0028132 A1 Jan. 29, 2026

(51) Int. Cl.

| | |
|---|---|
| ***B64D 43/00*** | (2006.01) |
| ***B64F 5/60*** | (2017.01) |
| ***G08B 21/14*** | (2006.01) |
| ***H02J 7/70*** | (2026.01) |

(52) U.S. Cl.

CPC ................ *B64D 43/00* (2013.01); *B64F 5/60* (2017.01); *G08B 21/14* (2013.01); *H02J 7/70* (2026.01); *H02J 2207/30* (2020.01)

(58) Field of Classification Search

CPC . B64D 43/00; B64F 5/60; G08B 21/14; H02J 7/0042; H02J 2207/30

See application file for complete search history.

(56) References Cited

U.S. PATENT DOCUMENTS

| | | | |
|---|---|---|---|
| 10,725,007 B2 | 7/2020 | Bartosz et al. | |
| 11,591,108 B2 | 2/2023 | Miller et al. | |
| 11,635,312 B2 | 4/2023 | Fox et al. | |
| 11,677,428 B2 | 6/2023 | Ruttler et al. | |
| 11,756,400 B2 | 9/2023 | Griffith et al. | |
| 2008/0147245 A1* | 6/2008 | Koepf .................... | G06F 11/25 701/1 |

(Continued)

FOREIGN PATENT DOCUMENTS

| | | |
|---|---|---|
| EP | 2196775 A2 | 6/2010 |
| EP | 3501998 A1 | 6/2019 |

OTHER PUBLICATIONS

Pacific Coast Avionics, Airplane Co2 Detector—FMS 650, downloaded from https://www.pacificcoastavionics.com/products/co-guardian-fms-650 on Dec. 21, 2023.

(Continued)

*Primary Examiner* — Michael C Zarroli

(74) *Attorney, Agent, or Firm* — Ingrassia Fisher & Lorenz

(57) ABSTRACT

An integrated device for a vehicle includes a housing, a wireless transceiver, at least one universal serial bus (USB) circuit, and a processor. The housing is adapted to be mounted within a vehicle. The wireless transceiver is disposed within the housing and is configured to wirelessly connect with one or more devices that are disposed external to the housing. The at least one USB circuit is disposed within the housing and includes a USB port adapted to receive a USB connector. The processor is disposed within the housing and is in operable communication with, and is configured to at least implement built-in testing (BIT) of, the wireless transceiver and the at least one USB circuit. The device may also include a carbon monoxide (CO) sensor.

10 Claims, 1 Drawing Sheet

(56) References Cited

U.S. PATENT DOCUMENTS

| | | | | |
|---|---|---|---|---|
| 2011/0054721 | A1 | 3/2011 | Goodrich et al. | |
| 2016/0272341 | A1 | 9/2016 | Van Horn et al. | |
| 2018/0170575 | A1 * | 6/2018 | Ziarno | B64F 5/60 |
| 2021/0001998 | A1 | 1/2021 | Miller et al. | |

OTHER PUBLICATIONS

Lightstone, Phil, "CO Monitors: Aithre a Top Pick," Jan. 25, 2023, downloaded from https://www.aviationconsumer.com/accessories/co-monitors-aithre-a-top-pick/ on Dec. 21, 2023.

Avionics Source, Guardian Avionics Aero 454-101 CO Detector with BT, downloaded from https://avionicssource.com/product/guardian-avionics-aero-454-101-co-detector-with-bt/ on Jun. 10, 2024.

* cited by examiner

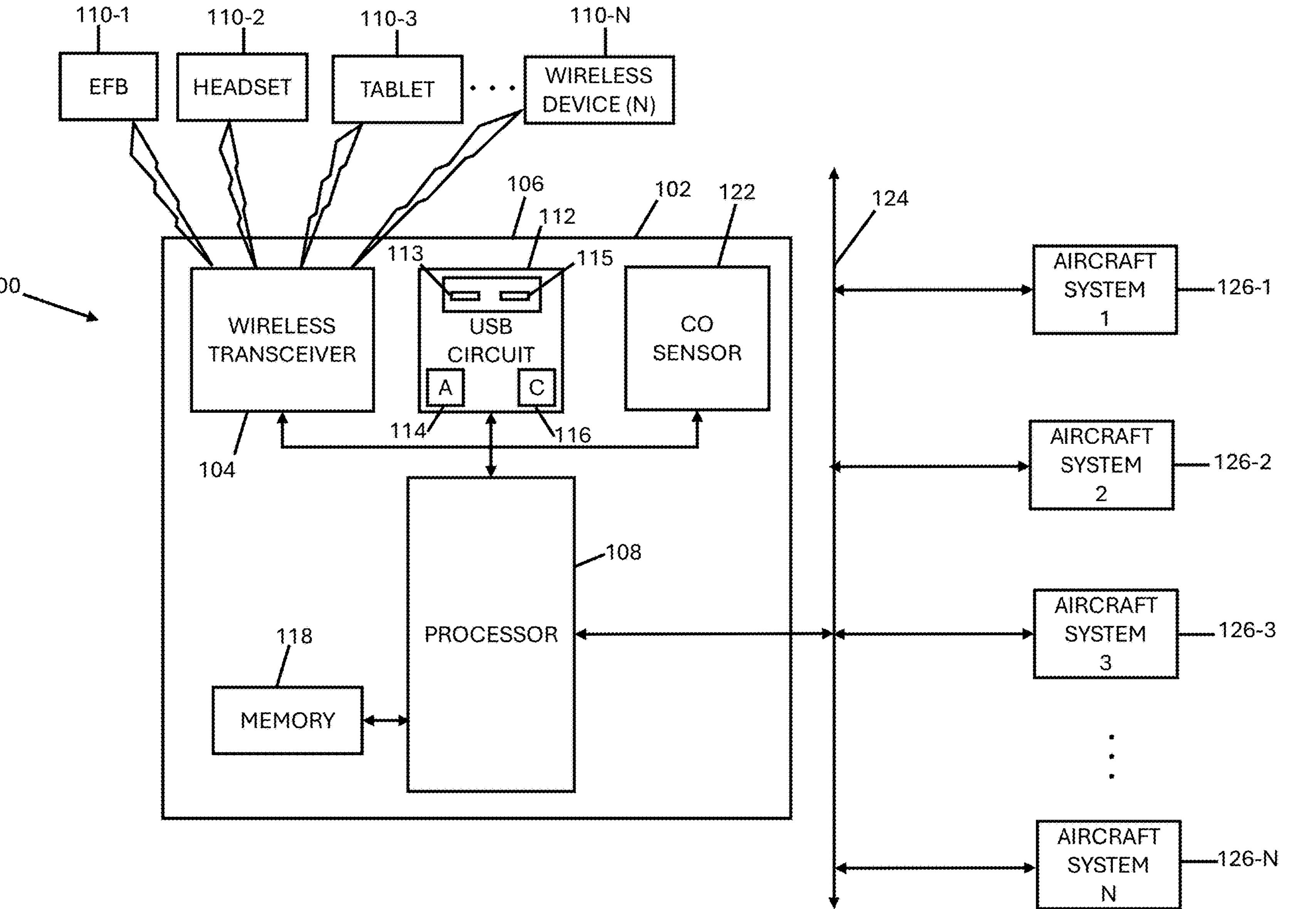
110-1
EFB
110-2
HEADSET
110-3
TABLET
110-N
WIRELESS DEVICE (N)
100
106
112
102
122
124
113
115
WIRELESS TRANSCEIVER
USB CIRCUIT
A
C
CO SENSOR
114
116
104
108
PROCESSOR
118
MEMORY
AIRCRAFT SYSTEM 1
126-1
AIRCRAFT SYSTEM 2
126-2
AIRCRAFT SYSTEM 3
126-3
AIRCRAFT SYSTEM N
126-N

INTEGRATED DEVICE FOR USE IN A VEHICLE

TECHNICAL FIELD

The present disclosure relates to an integrated device for vehicles and, more particularly, a device that integrates several devices currently implemented as separate devices into a single device housing.

BACKGROUND

In many general aviation environments, pilots will bring various hand-held devices into the aircraft cockpit. The hand-held devices may vary but may include individual devices such as carbon monoxide (CO) sensors, battery packs for personal electronics, and wireless communication adapters (e.g., Bluetooth® transceivers) for audio headsets, just to name a few. Certain panel mount versions of these various hand-held devices are also available; however, these devices require separate installations, which can lead to increased costs.

Hence, there is a need for a device that integrates several devices that are currently implemented as separate, individual devices into a single device housing and that does not rely on separate installation. The present disclosure addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, an integrated device for a vehicle includes a housing, a wireless transceiver, at least one universal serial bus (USB) circuit, and a processor. The housing is adapted to be mounted within a vehicle. The wireless transceiver is disposed within the housing and is configured to wirelessly connect with one or more devices that are disposed external to the housing. The at least one USB circuit is disposed within the housing and includes a USB port adapted to receive a USB connector. The processor is disposed within the housing and is in operable communication with, and is configured to at least implement built-in testing (BIT) of, the wireless transceiver and the at least one USB circuit.

In another embodiment, an integrated device for an aircraft includes a housing, a wireless transceiver, at least one universal serial bus (USB) circuit, and a processor. The housing is adapted to be mounted within a cockpit of an aircraft. The wireless transceiver is disposed within the housing and is configured to wirelessly connect with one or more devices that are disposed external to the housing. The at least one USB circuit is disposed within the housing and includes a USB port adapted to receive a USB connector. The processor is disposed within the housing and is in operable communication with, and configured to at least implement built-in testing (BIT) of, the wireless transceiver and the at least one USB circuit. The processor is further configured to interface with at least one aircraft avionics bus to thereby communicate with one or more aircraft systems, distribute commands supplied from the one or more aircraft systems to the wireless transceiver and the at least one USB circuit, and aggregate and transmit operational status of the wireless transceiver and the at least one USB circuit to the one or more aircraft systems.

In yet another embodiment, an integrated device for an aircraft includes a housing, a Bluetooth® compatible wireless transceiver, a carbon-monoxide (CO) sensor, at least one universal serial bus (USB) circuit, and a processor. The housing is adapted to be mounted within a cockpit of an aircraft. The Bluetooth® compatible wireless transceiver is disposed within the housing and is configured to wirelessly connect with one or more devices that are disposed external to the housing. The CO sensor is disposed within the housing and is configured to sense CO levels within the cockpit of the aircraft. The at least one USB circuit is disposed within the housing and includes a USB port adapted to receive a USB connector. The processor is disposed within the housing and is in operable communication with, and configured to at least implement built-in testing (BIT) of, the Bluetooth® compatible wireless transceiver, the CO sensor, and the at least one USB circuit. The processor is further configured to interface with at least one aircraft avionics bus to thereby communicate with one or more aircraft systems, distribute commands supplied from the one or more aircraft systems to the wireless transceiver, the at least one USB circuit, and the CO sensor, and aggregate and transmit operational status of the wireless transceiver, the at least one USB circuit, and the CO sensor to the one or more aircraft systems.

Furthermore, other desirable features and characteristics of the integrated device will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing FIGURES, wherein like numerals denote like elements, and wherein:

FIG. 1 is a simplified functional block diagram of one example embodiment of an integrated device for a vehicle, such as an aircraft.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Moreover, although the embodiments disclosed herein are described as being implemented in an aircraft, these devices may also be implemented in various other types of vehicles, including various land-based vehicles, water borne vehicles, and spacecraft.

Referring to FIG. 1, a simplified functional block diagram of one example embodiment of an integrated device 100 for an aircraft is depicted. The depicted integrated device includes at least a housing 102, a wireless transceiver 104, at least one universal serial bus (USB) circuit 106, and a processor 108. The housing 102, which may be variously shaped and may comprise various types of materials, is adapted to be mounted within a cockpit of an aircraft.

The wireless transceiver 104 is disposed within the housing 102 and is configured to wirelessly connect with one or more devices 110 that are disposed external to the housing 102. The one or more devices 110 may vary and may include, for example, one or more of an electronic flight bag 110-1, a headset 110-2, a tablet 110-3, or any one of numerous other devices 110-N, such as a laptop or a cell phone, just to name a few. It will additionally be appreciated that the wireless transceiver 104 may be configured to communicate via various types of wireless communication protocols. In one embodiment, however, it is a Bluetooth® compatible transceiver.

The USB circuit 106 is also disposed within the housing 102 and includes at least one USB port 112 adapted to receive a USB connector. It will be appreciated that the at least one USB circuit 106 may include one or both of a USB type A charging circuit 114 and a USB type C charging circuit 116. Preferably, the integrated device 100 includes both types of charging circuits 114, 116. In such embodiments, the at least one USB port 112 includes a USB-A port 113 and a USB-C port 115. Moreover, the integrated device 100 may include other types of USB charging circuits and associated ports that may be developed in the future.

The processor 108 is also disposed within the housing 102 and is in operable communication with the wireless transceiver 104 and the at least one USB circuit 106. The processor 108 is configured, via programming instructions stored in a memory 118, to implement various functions. These functions include at least built-in testing (BIT) of the wireless transceiver 104 and the at least one USB circuit 106.

As FIG. 1 further depicts, the integrated device 100 may also, at least in some embodiments, include a carbon-monoxide (CO) sensor 122. The CO sensor 122, when included, is also disposed within the housing 102 and is configured to sense CO levels within the cockpit of the aircraft. As may be appreciated, and as FIG. 1 further depicts, in these embodiments the processor 108 is also in operable communication with the CO sensor 122 and is further configured to at least implement BIT of the CO sensor 122.

Whether or not the integrated device 100 includes the CO sensor 122, the processor 108 is further configured to interface with at least one aircraft avionics bus 124 to thereby communicate with one or more aircraft systems 126. For example, the processor 108 may be configured to interface with an ARINC 429 bus, an RS-422 bus, a CAN bus, or any one of numerous other suitable aircraft avionics bus-types, to allow communications with the one or more aircraft systems 126. The one or more aircraft systems 126 may include, for example, various controllers and displays.

The processor 108 may additionally be configured to receive commands supplied from the one or more aircraft systems 126, via the at least one aircraft avionics bus 124, and distribute the commands to one or more of the wireless transceiver 104, the at least one USB circuit 106, and (when included) the CO sensor 122. The processor 108 may additionally be configured to aggregate and transmit operational the status of one or more of the wireless transceiver 104, the at least one USB circuit 106, and (when included) the CO sensor 122 to the one or more aircraft systems 126.

The integrated device 100 described herein integrates several devices that are currently implemented as separate, individual devices into a single device housing and that does not rely on separate installation.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An integrated device for a vehicle, comprising:

a housing adapted to be mounted within a vehicle;

a wireless transceiver disposed within the housing, the wireless transceiver configured to wirelessly connect with one or more devices that are disposed external to the housing;

a carbon-monoxide (CO) sensor disposed within the housing, the CO sensor configured to sense CO levels within the vehicle;

at least one universal serial bus (USB) circuit disposed within the housing, the at least one USB circuit including a USB port adapted to receive a USB connector; and a processor disposed within the housing and in operable communication with, and configured to at least implement built-in testing (BIT) of, the wireless transceiver, the CO sensor, and the at least one USB circuit, wherein:

the vehicle is an aircraft;

the processor is further configured to interface with at least one aircraft avionics bus to thereby communicate with one or more aircraft systems, and the processor is further configured to (i) distribute commands supplied from the one or more aircraft systems to the wireless transceiver, the at least one USB circuit, and the CO sensor (ii) and aggregate and transmit operational status of the wireless transceiver, the at least one USB circuit, and the CO sensor to the one or more aircraft systems.

2. The integrated device of claim 1, wherein the wireless transceiver is a personal area network compatible transceiver.

3. The integrated device of claim 1, wherein the at least one USB circuit includes one or both of a USB type A charging circuit and a USB type C charging circuit.

4. An integrated device for an aircraft, comprising:

a housing adapted to be mounted within a cockpit of an aircraft;

a wireless transceiver disposed within the housing, the wireless transceiver configured to wirelessly connect with one or more devices that are disposed external to the housing;

at least one universal serial bus (USB) circuit disposed within the housing, the at least one USB circuit including a USB port adapted to receive a USB connector; and a processor disposed within the housing and in operable communication with, and configured to at least implement built-in testing (BIT) of, the wireless transceiver and the at least one USB circuit, wherein the processor is further configured to:

interface with at least one aircraft avionics bus to thereby communicate with one or more aircraft systems, distribute commands supplied from the one or more aircraft systems to the wireless transceiver and the at least one USB circuit, and aggregate and transmit operational status of the wireless transceiver and the at least one USB circuit to the one or more aircraft systems.

5. The integrated device of claim 4, further comprising:

a carbon-monoxide (CO) sensor disposed within the housing, the CO sensor configured to sense CO levels within the cockpit of the aircraft, wherein the processor is in operable communication with, and is configured to at least implement BIT of, the CO sensor.

6. The integrated device of claim 5, wherein the processor is further configured to:

distribute commands supplied from the one or more aircraft systems to the CO sensor, and aggregate and transmit operational status of the CO sensor to the one or more aircraft systems.

7. The integrated device of claim 4, wherein the wireless transceiver is a personal area network compatible transceiver.

8. The integrated device of claim 4, wherein the at least one USB circuit includes one or both of a USB type A charging circuit and a USB type C charging circuit.

9. An integrated device for an aircraft, comprising:

a housing adapted to be mounted within a cockpit of an aircraft;

a personal area network compatible wireless transceiver disposed within the housing, the personal area network compatible wireless transceiver configured to wirelessly connect with one or more devices that are disposed external to the housing;

a carbon-monoxide (CO) sensor disposed within the housing, the CO sensor configured to sense CO levels within the cockpit of the aircraft;

at least one universal serial bus (USB) circuit disposed within the housing, the at least one USB circuit including a USB port adapted to receive a USB connector; and a processor disposed within the housing and in operable communication with, and configured to at least implement built-in testing (BIT) of, the Bluetooth® compatible wireless transceiver, the CO sensor, and the at least one USB circuit, wherein the processor is further configured to:

interface with at least one aircraft avionics bus to thereby communicate with one or more aircraft systems, distribute commands supplied from the one or more aircraft systems to the wireless transceiver, the at least one USB circuit, and the CO sensor, and aggregate and transmit operational status of the wireless transceiver, the at least one USB circuit, and the CO sensor to the one or more aircraft systems.

10. The integrated device of claim 9, wherein the at least one USB circuit includes one or both of a USB type A charging circuit and a USB type C charging circuit.

* * * * *